US010534508B2

(12) United States Patent
Pendergast et al.

(10) Patent No.: US 10,534,508 B2
(45) Date of Patent: Jan. 14, 2020

(54) SHARING MEDIA CONTENT (71) Applicant: Apple Inc., Cupertino, CA (US)

(72) Inventors: Colleen M. Pendergast, Livermore, CA (US); Giovanni Agnoli, San Mateo, CA (US); Harita Patel, Cupertino, CA (US); Daniel I. Lipton, Belmont, CA (US)

(73) Assignee: Apple Inc., Cupertino, CA (US)

( * ) Notice: Subject to any disclaimer, the term of this patent is extended or adjusted under 35 U.S.C. 154(b) by 94 days.

(21) Appl. No.: 15/596,999

(22) Filed: May 16, 2017

(65) Prior Publication Data

US 2017/0249064 A1 Aug. 31, 2017

Related U.S. Application Data

(62) Division of application No. 13/656,285, filed on Oct. 19, 2012, now Pat. No. 9,684,431.

(51) Int. Cl.
*G06F 3/0482* (2013.01)
*G06F 16/78* (2019.01)

(52) U.S. Cl.
CPC ........ *G06F 3/0482* (2013.01); *G06F 16/7867* (2019.01)

(58) Field of Classification Search
CPC ................ G06F 17/3082; H04L 65/60; Y10S 707/99948; G06Q 50/01; H04N 1/00464
See application file for complete search history.

(56) References Cited

U.S. PATENT DOCUMENTS

| | | | |
|---|---|---|---|
| 6,073,110 A | 6/2000 | Rhodes | |
| 6,597,375 B1 | 7/2003 | Yawitz | |
| 7,562,311 B2 | 7/2009 | Schiller | |
| 8,156,442 B2 | 4/2012 | Aoki et al. | |
| 8,175,395 B2 | 5/2012 | Reynolds et al. | |
| 8,869,068 B2* | 10/2014 | Primiani | G06F 3/048 715/810 |
| 9,153,000 B2 | 10/2015 | Kazan | |
| 9,684,431 B2 | 6/2017 | Pendergast et al. | |
| 2002/0056123 A1 | 5/2002 | Liwerant et al. | |
| 2004/0136698 A1 | 7/2004 | Mock | |
| 2005/0237567 A1 | 10/2005 | Morris | |
| 2007/0101271 A1 | 5/2007 | Hua et al. | |
| 2007/0162855 A1 | 7/2007 | Hawk et al. | |
| 2008/0013916 A1 | 1/2008 | Sharpe et al. | |
| 2009/0144392 A1 | 6/2009 | Wang et al. | |
| 2009/0249427 A1 | 10/2009 | Dunnigan | |
| 2009/0297118 A1* | 12/2009 | Fink | G06F 17/3082 386/278 |

(Continued)

*Primary Examiner* — Namitha Pillai
(74) *Attorney, Agent, or Firm* — Fish & Richardson P.C.

(57) ABSTRACT

Among other things, a method includes receiving, from a user of a user interface of a media authoring application, first settings specifying a destination for media content authored in the media authoring application, the destination selected from a set of destinations supported by the media authoring application, and second settings specifying a set of media characteristics of media content authored in the media authoring application, and generating data representing a user interface element usable to provide media content authored in the media authoring application to the destination specified in the first settings at the set of media characteristics specified in the second settings.

16 Claims, 9 Drawing Sheets

(56) References Cited

U.S. PATENT DOCUMENTS

| | | |
|---|---|---|
| 2010/0332981 A1 | 12/2010 | Lipton et al. |
| 2011/0008023 A1 | 1/2011 | Pottter |
| 2011/0060994 A1 | 3/2011 | Maxwell et al. |
| 2011/0161818 A1* | 6/2011 | Viljamaa ................ G11B 27/28 715/720 |
| 2012/0137237 A1 | 5/2012 | Brenner |
| 2013/0091444 A1 | 4/2013 | de Halleux et al. |
| 2013/0346877 A1 | 12/2013 | Borovoy |
| 2014/0115469 A1 | 4/2014 | Pendergast et al. |

* cited by examiner

SHARING MEDIA CONTENT

CROSS-REFERENCE TO RELATED APPLICATION

This application is a continuation of and claims priority to U.S. patent application Ser. No. 13/656,285, entitled "Sharing Media Content," filed Oct. 19, 2012, the entire contents of which are incorporated herein by reference.

TECHNICAL FIELD

The disclosure generally relates to sharing media content.

BACKGROUND

Media content, for example, images, audio, and video, can be authored in a media authoring application (e.g., image editor, video editor, sound editor) and published for distribution. Media content that is published in this way is sometimes referred to media that has been shared. For example, media can be shared with users of systems such as social networking systems and online media repositories.

SUMMARY

In one aspect, in general, a method includes receiving, from a user of a user interface of a media authoring application, first settings specifying a destination for media content authored in the media authoring application, the destination selected from a set of destinations supported by the media authoring application, and second settings specifying a set of media characteristics of media content authored in the media authoring application, and generating data representing a user interface element usable to provide media content authored in the media authoring application to the destination specified in the first settings at the set of media characteristics specified in the second settings.

Implementations may include one or more of the following features. A mechanism is provided to share the data representing the user interface element with users other than the user of the user interface of the media authoring application. The user interface element can be dragged from the user interface of the media authoring application to share the data in the form of a data file. The destination is a social networking service and the first settings include information about a user account of the social networking service. The first settings specify a second destination for the media content. The second settings specify a second set of media characteristics for the media content.

In another aspect, in general, a method includes receiving an indication that a user of a user interface of a media authoring application has invoked a first user interface element in a menu of user interface elements, each user interface element representing data that includes first settings specifying a destination for media content authored in the media authoring application, the destination selected from a set of destinations supported by the media authoring application, and second settings specifying a set of media characteristics of media content authored in the media authoring application, and in response to the user having invoked the first user interface element, providing media content authored in the media authoring application to the destination specified in the first settings at the set of media characteristics specified in the second settings.

Implementations may include one or more of the following features. Metadata of the media content is accessed and an interface is provided enabling the user to select at least some of the metadata to include in the media content supplied to the destination. The selected metadata is stored for subsequent provisions of the media content to other destinations selected from among the set of destinations supported by the media authoring application. For at least one user interface element in the menu of user interface elements, an indication is provided in the user interface of media file characteristics for media content generated if the user were to invoke the at least one user interface element.

In a further aspect, in general, a method includes receiving an indication that a user of a user interface of a video authoring application has invoked a user interface element representing data that includes first settings specifying a destination for video content authored in the video authoring application and second settings specifying a set of video characteristics of video content authored in the video authoring application, and in response to the user having invoked the first user interface element, for first video content chosen by the user, the first video content having chapters each representing a portion of the first video content, providing an interface enabling the user to choose a video frame from among video frames of each chapter, and generating metadata designating each chosen video frame as representative of the content of each chapter.

Implementations may include one or more of the following features. The video content and the generated metadata are provided to the destination specified in the first settings.

Other aspects may include corresponding systems, apparatus, or computer readable media.

Details of one or more implementations are set forth in the accompanying drawings and the description below. Other features, aspects, and potential advantages will be apparent from the description and drawings, and from the claims.

DESCRIPTION OF DRAWINGS

Like reference symbols in the various drawings indicate like elements.

DETAILED DESCRIPTION

A user interface of a media authoring application (e.g., video editing software) can be used to provide media content (e.g., a finished video) to a destination. The destination could be a social networking service like Facebook, Twitter, Tumblr, or YouTube. The destination could also be another type of destination such as a storage device or other software application. The user may prefer to specify different media characteristics (e.g., video quality, video file format, video resolution) for different destinations. Rather than require a user to specify media characteristics each time the user chooses a destination, the user can establish settings that tie a particular destination to a particular set of media characteristics. The settings can be placed in a menu in the application for the user to re-use with any media content being authored in the application.

The user interface could display information about media file characteristics (e.g., file size) if the user were to invoke a button in the menu and apply the underlying settings to media content that the user is authoring. If the media content is video, the user interface could also allow the user to choose a frame representative of each chapter of the video, for example, for use in a chapter index.

Figure 1:
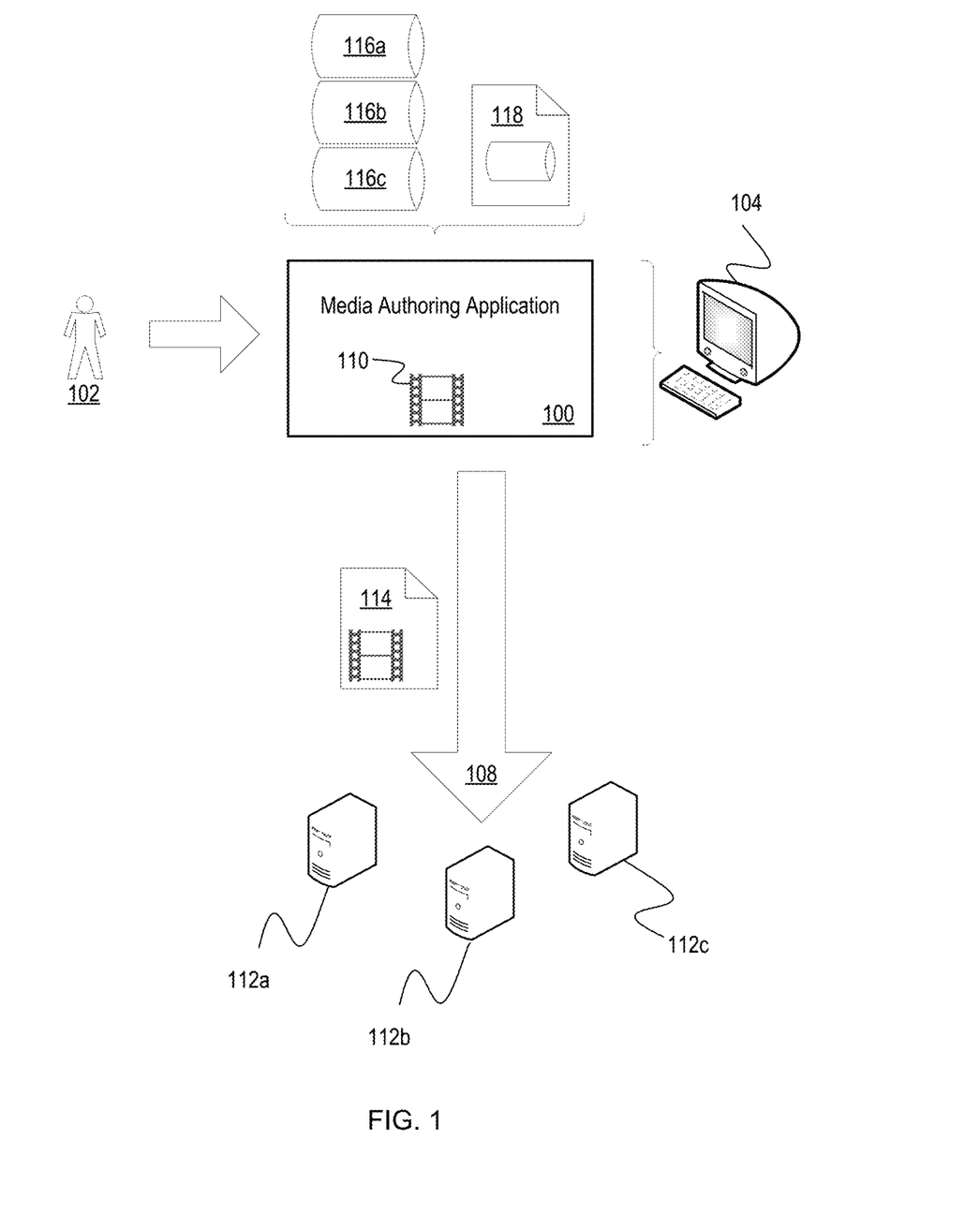
FIG. 1 shows a media authoring application being operated by a user of a computer system.

FIG. 1 shows a media authoring application 100 being operated by a user 102 of a computer system 104. The media authoring application 100 enables the user 102 to author media content 110, for example, audio, video, still images, or any combination of these or other media. The media authoring application 100 also enables the user 102 to publish 108 the media content 110 to media destinations 112a-c.

The media destinations 112a-c could be any destination for media content. For example, the media destinations 112a-c could include social networking services (e.g., Facebook, YouTube, LinkedIn, Pinterest), online media repositories (e.g., iCloud), web servers, storage devices (e.g., a hard drive in communication with the computer system 104), or any other destination for media. The act of publishing 108 media content 110 to the media destinations 112a-c may include any combination of generating a media data file 114 from the media content 110 and formatting the media content 110 in the media data file 114. Formatting could include formatting the media data file into a format usable by the respective media destination, or altering characteristics of the media content based on settings associated with the respective media destination. If the media content 110 is a video, for example, the act of publishing 108 the video could include formatting the video to a particular data format (e.g., MPEG), and changing the resolution or audio quality to a form preferred for a particular media destination.

The media authoring application 100 can be configured to publish media content 110 to media destinations 112a-c in particular ways. For example, the media authoring application 100 can have configurations 116a-c that specify instructions for publishing media content to particular media destinations 112a-c. Each configuration 116a-c could indicate at least one media destination and at least one set of media characteristics.

The instructions specified for publishing media content to a particular media destination can be of a type specific to the type of media destination. For example, if the media destination is a social networking service or a media repository, the configurations 116a-c could specify information about a user account of the social networking service or a media repository. If the media destination is a social networking service, the configurations 116a-c could specify information about privacy settings for the published media content (e.g., whether the media content will be visible by just the user associated with the user account, or visible to the public, or visible to friends/connections of the user). If the media destination is a storage device, the configurations 116a-c could specify information about a destination directory of the storage device.

The instructions specified for publishing media content under a set of media characteristics could specify one or more of several types of characteristics applicable to a particular kind of content. For example, if the media content is video, the characteristics could include frame size (pixel dimensions), aspect ratio, video compression/quality, soundtrack audio compression/quality, and file format. Video content may have other characteristics that can be specified, and other kinds of content may have other kinds of characteristics.

A user of the media authoring application 100 can activate one of the configurations 116a-c to publish media content 110 (e.g., media content authored in the media authoring application and selected in the media authoring application for publication). For example, the media authoring application may have a button or other control associated with the configuration, so that when a user activates the control, the selected media content is published to a media destination 112a-c specified by the configuration and using media characteristics specified by the configuration. The published media content (e.g., a data file representing the media content selected for publication) is generated by the media authoring application based on the media characteristics specified by the configuration.

In some implementations, the configurations 116a-c can each specify more than one media destination 112a-c. For example, a particular configuration may specify instructions for publishing the same media content 110 to a first media destination 112a and also to a second media destination 112b. In some examples, the same media characteristics could be used for multiple media destinations. In some examples, one set of media characteristics is specified for one media destination, and another set of media characteristics is specified for another media destination.

In some implementations, the media authoring application 100 enables the user 102 to share configurations 116a-c with other users. For example, the user 102 may generate a configuration in the media authoring application 100 and then use the media authoring application 100 to generate a data file 118 representing the configuration (e.g., containing data representing the configuration). The data file 118 can then be shared with other users. The user 102 could also accept data files from other users to add configurations 116a-c to the media authoring application 100.

Figure 2:
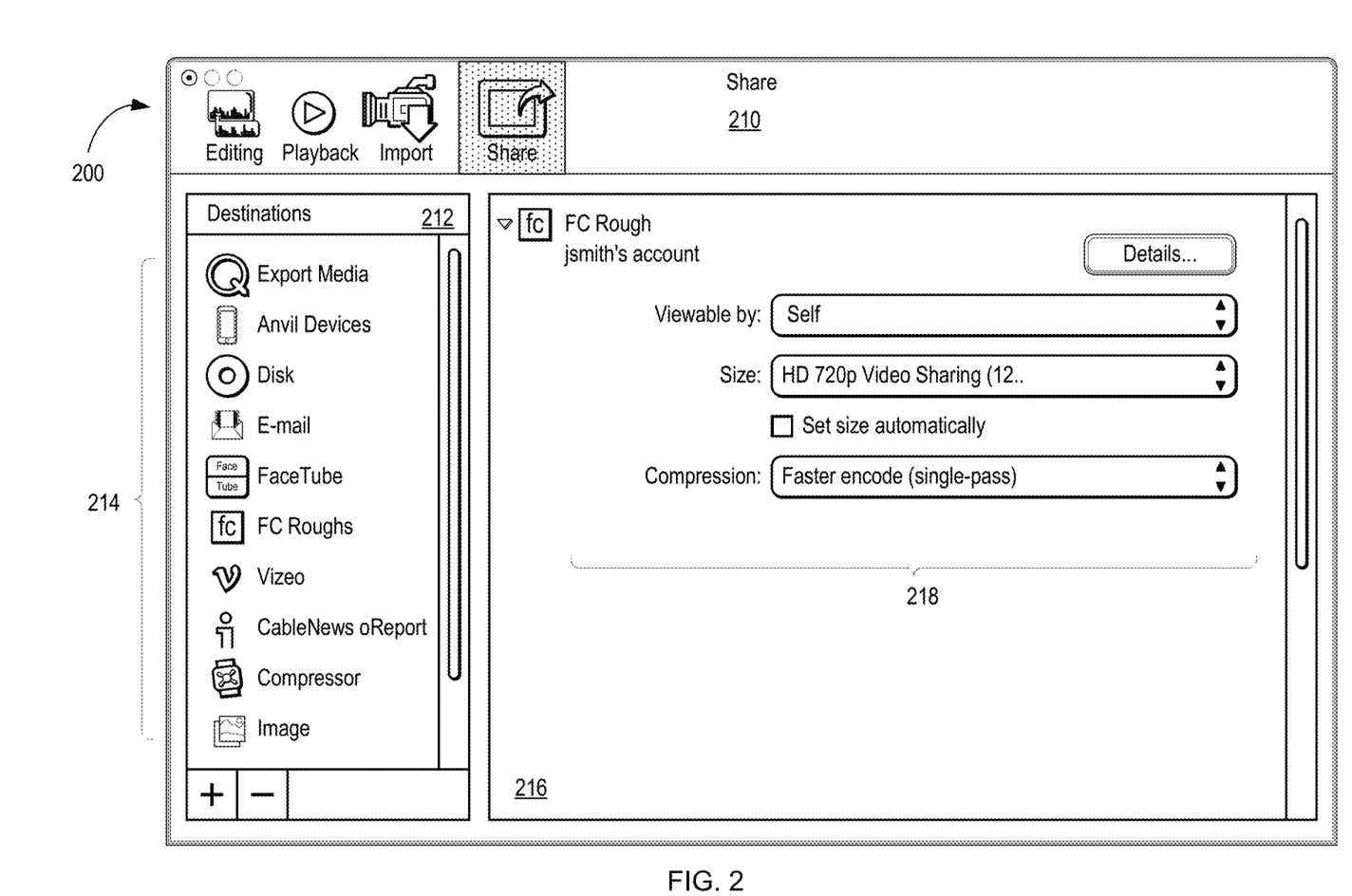
FIG. 2 shows an example user interface of the media authoring application.

FIG. 2 shows an example user interface 200 of the media authoring application 100 (FIG. 1). The user interface 200 can be used to facilitate the publishing of media content as described with respect to FIG. 1. This user interface 200 is just one example of an interface that can be used, and other implementations of the media authoring application 100 may use other types of interfaces.

The user interface 200 displays a share pane 210 enabling a user 102 (FIG. 1) to configure the media authoring application 100 to publish (also called "share") content. The share pane 210 displays a destination list 212 with menu items 214 each representing a configuration (e.g., one of the configurations 116a-c shown in FIG. 2) for publishing media content. The user can use each of the menu items 214 to configure the publication of media content to a particular media destination. For example, a user can click on (or otherwise invoke) a menu item 214 to display a configuration pane 216 in the user interface 200. The configuration pane 216 provides options by which a user can select configuration options 218 for this menu item 214. For example, the configuration options 218 can include media characteristics associated with this configuration, account settings associated with this configuration (e.g., a username and password for a social networking service account), and privacy settings for media content published using this configuration. The configurations represented by the menu items 214 can later be used to publish media content to the specified destination using the specified configuration options. For example, a single button representing any of configurations can be clicked (or otherwise invoked) by a user to publish media content to the specified destination and using the specified configuration options without further input from the user. The user need not, for example, specify media characteristics when the user wishes to publish media content to a particular media destination associated with a configuration. The user could also specify multiple configurations for a particular media destination, each specifying different media characteristics.

In some implementations, a user can generate a data file representing the configuration options 218 for a chosen menu item 214. For example, the user can select and drag the menu item, e.g., to a file folder of a file system of the computer system 104 running the media authoring application 100 to share the configuration options 218 in the form of a data file. The data file can then be shared with other users and used with other instances of the media authoring application 100 used by the other users. Other users can use the configuration options 218 in the same manner as a user of this user interface 200 uses the configuration options 218.

Figure 3:
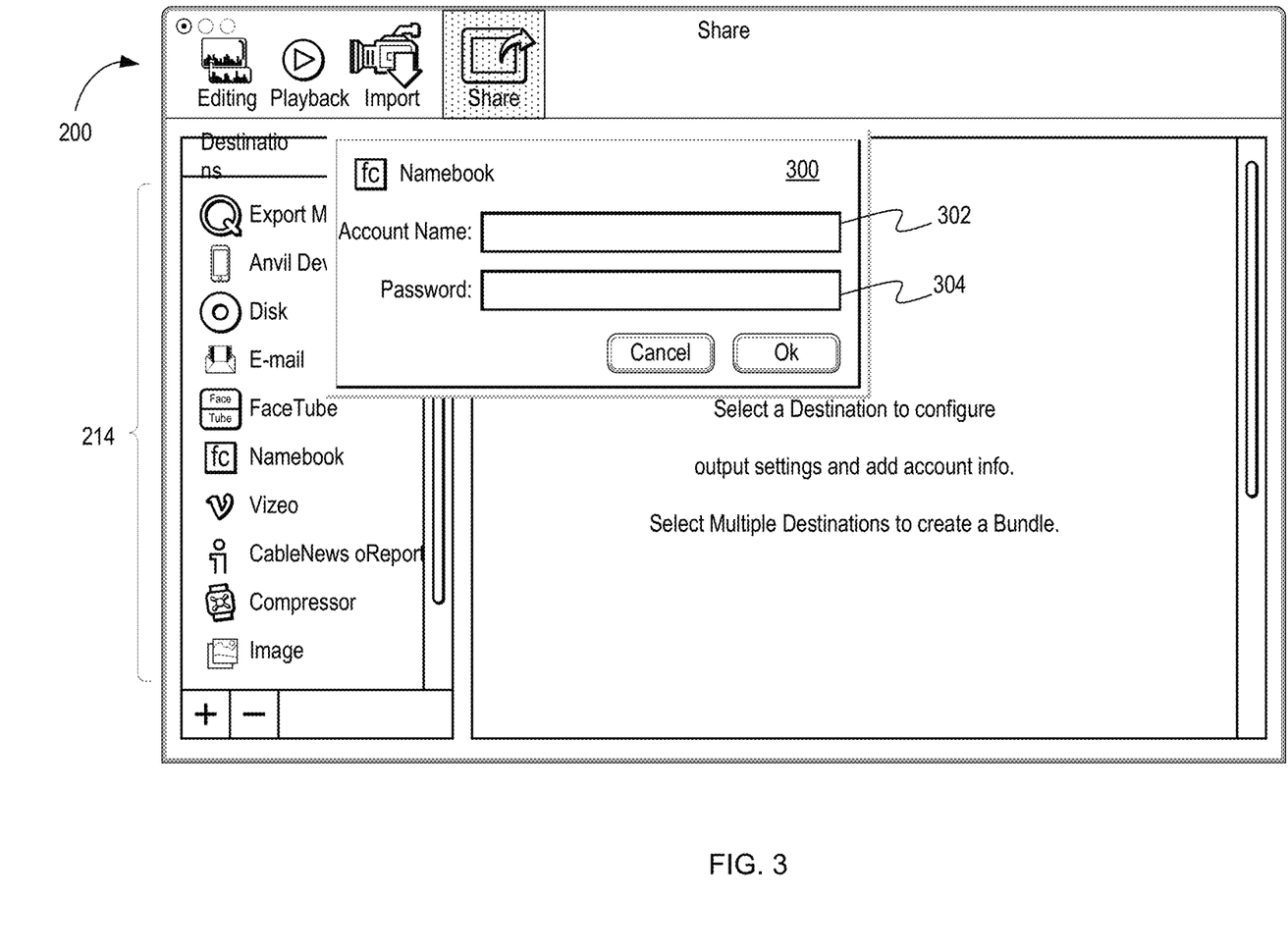
FIG. 3 shows a view of the user interface enabling a user to enter in account information for a media destination.

FIG. 3 shows a view of the user interface 200 enabling a user to enter in account information for a media destination. In some implementations, if a menu item 214 represents a configuration for publishing media content to a media destination requiring authorization, such as an online media repository or social networking service, the configuration can specify account information that is used to authorize a user publishing the media content to the media destination. For example, the user interface 200 can present an account information window 300 allowing a user to enter a username 302 and password 304 or other information used to gain authorized access to the media destination. The information entered in the account information window 300 for a media destination can be stored in a configuration (e.g., one of the configurations 216a-c shown in FIG. 1) used to publish media content to the media destination. In this way, when the configuration is used to publish media content, a user need not enter in account information to access the media destination because the account information is stored in the configuration for later use.

Figure 4:
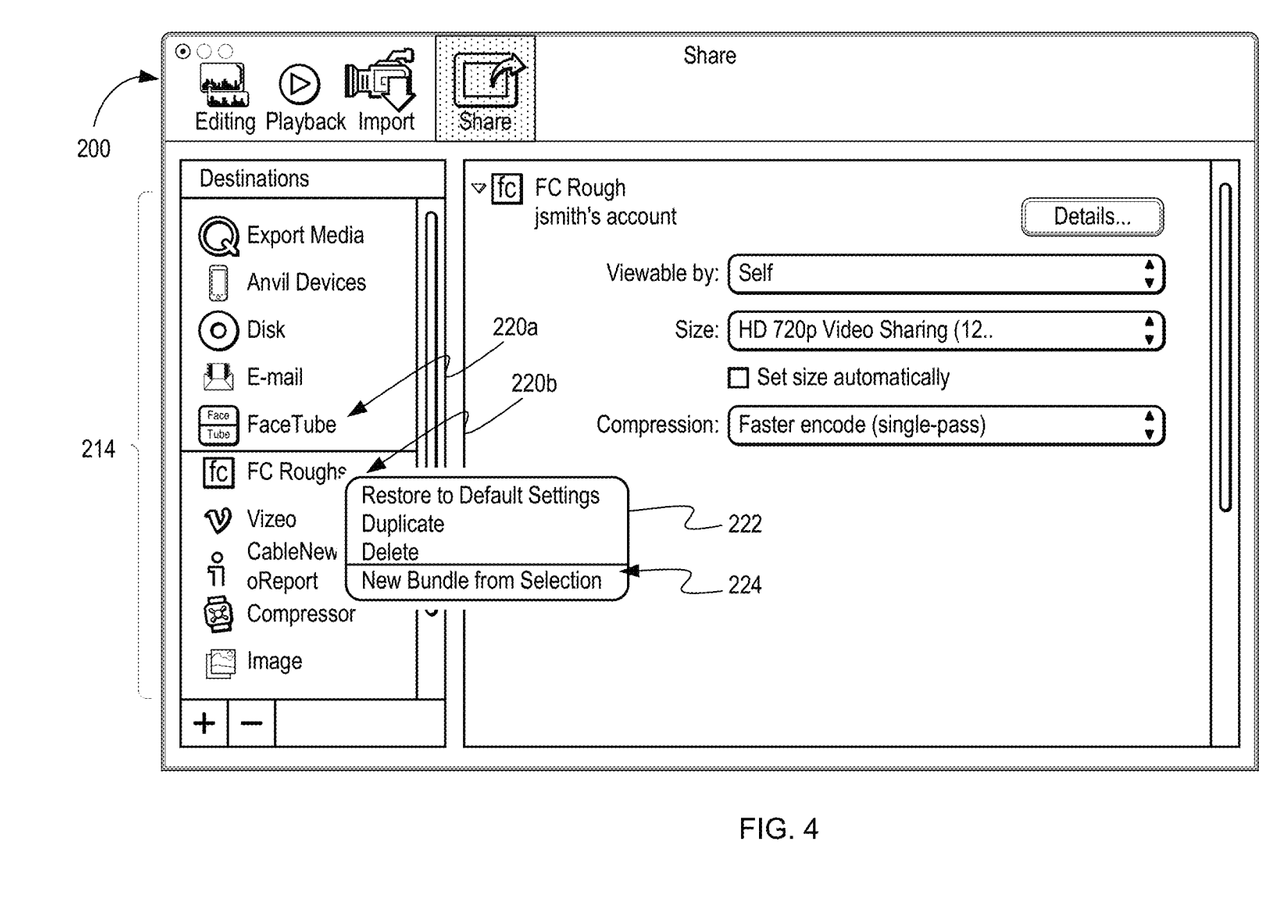
FIG. 4 shows a view of the user interface displaying functionality for enabling a user to publish media content to multiple media destinations using the same configuration.

FIG. 4 shows a view of the user interface 200 displaying functionality for enabling a user to publish media content to multiple media destinations using the same configuration. A user can select multiple menu items 220a, 220b and generate a new configuration incorporating the functionality of the configurations represented by the menu items 220a, 220b. Each of the menu items 220a, 220b may represent a configuration for publishing media content to different respective media destinations. For example, a user can make a selection of the multiple menu items 220a, 220b and activate a context-sensitive menu 222 (e.g., by right-clicking or control-clicking the selection of the multiple menu items 220a, 220b). The context-sensitive menu 222 includes a "New Bundle from Selection" option 224. When invoked, this option 224 generates a new configuration (and associated menu item) replicating the functionality of all of the selected multiple menu items 220a, 220b.

Figure 5:
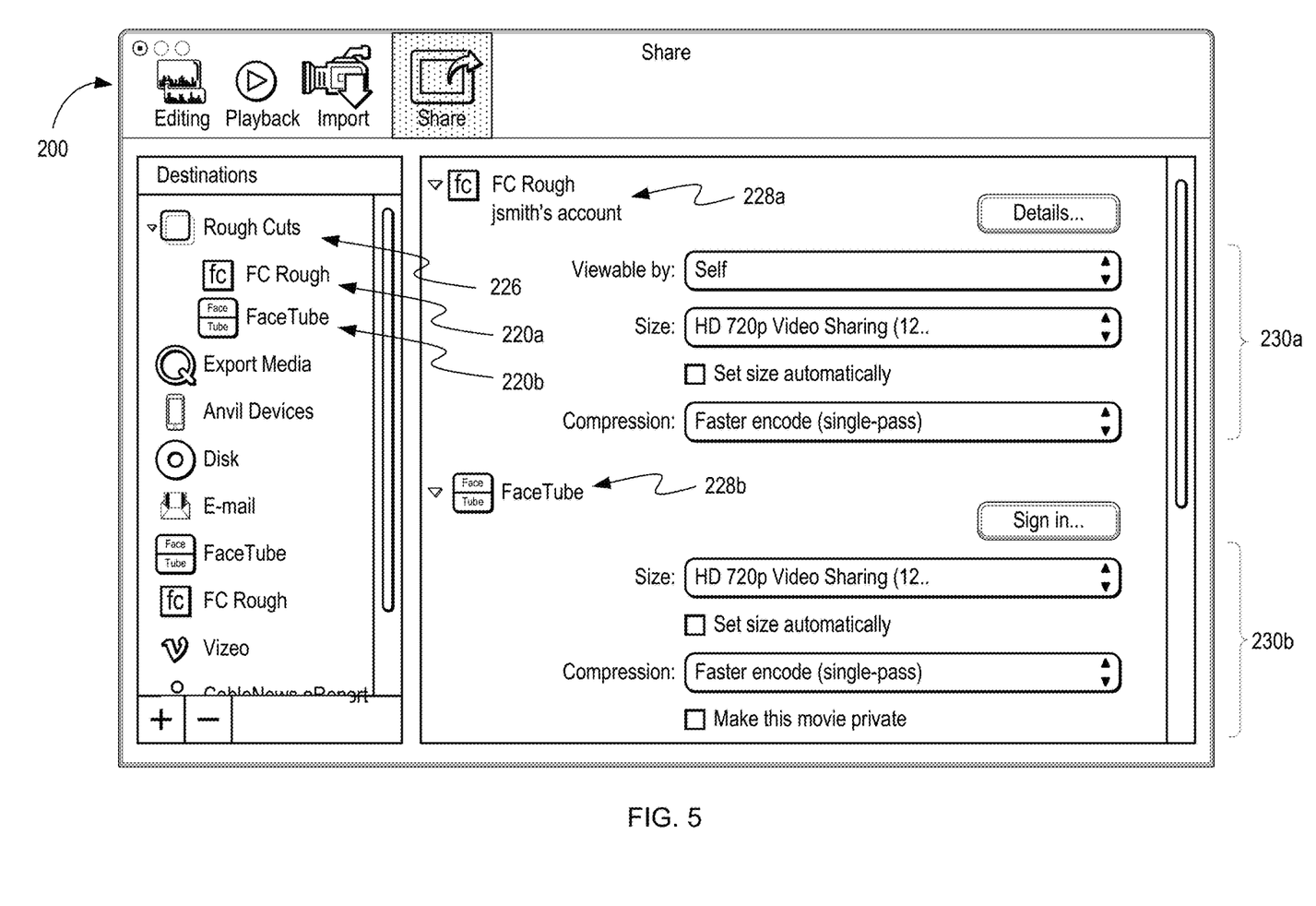
FIG. 5 shows a view of the user interface displaying configuration options for a configuration that enables a user to publish the same media content to multiple destinations.

FIG. 5 shows a view of the user interface 200 displaying configuration options for a configuration that enables a user to publish the same media content to multiple destinations. A menu item 226 represents a configuration for publishing media content to the multiple destinations represented by the menu items 220a, 220b shown in FIG. 4. Because the menu item 226 represents a configuration for publishing media content to multiple destinations, this kind of menu item 226 is sometimes referred to as a "bundle." The configuration pane 216 of the user interface 200 enables the user to configure media characteristics and other settings for a first media destination 228a and a second media destination 228b, each of which are social networking services. Here, each media destination is associated with its own respective set of media characteristics 230a, 230b, but in some examples, each media destination shares the same media characteristics. Further, the implementations described here enable a user to "bundle" together existing configurations for publishing media content to media destinations. In some implementations, a user can specify all of the configuration information for multiple media destinations when a configuration represented by the menu item 226 is generated, rather than combine existing configurations.

Although the first media destination 228a and the second media destination 228b each represent different social networking services, in some examples, a configuration could specify two different sets of configuration options for the same media destination, e.g., the same social networking service. For example, a configuration could specify instructions for publishing media content to the same social networking service using two different user accounts or two different sets of media characteristics, for example.

Figure 6:
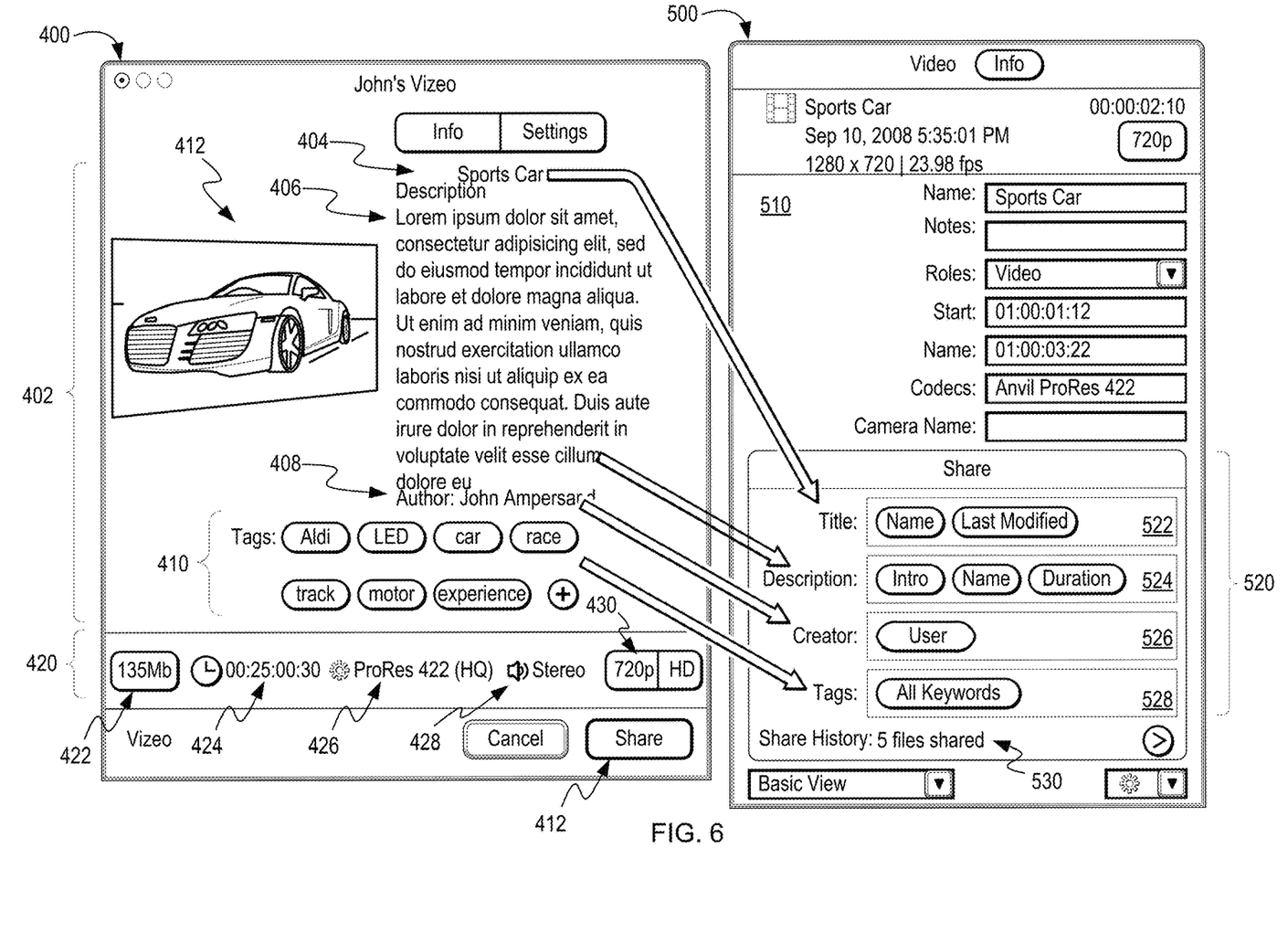
FIG. 6 shows views of additional user interfaces of the media authoring application.

FIG. 6 shows views of additional user interfaces 400, 500 of the media authoring application 100. The first user interface 400 enable a user to use a configuration (e.g., one of the configurations 116a-c shown in FIG. 1) to publish chosen media content to a media destination. For example, the user can select a configuration corresponding to one of the menu items 214 shown in FIG. 2 (e.g., in a list of destinations when the user accesses a "publish" command or other functionality of the media authoring application 100). The media authoring application 100 can then display the user interface 400, which displays information about the media content to be published and also displays controls for publishing the content. In some examples, the media content to be published is a video clip 402, and the user interface 400 displays information about the video clip 402. The information can include fields representing a title 404 for the video clip 402, a description 406 of the video clip 402, an author 408 of the video clip 402, keywords 410 describing the video clip 402, and a still image 412 representing the video clip 402. The information about the video clip 402 can come from any number of sources. For example, the information about the video clip 402 may come in part from information stored in association with the video clip 402, e.g., metadata stored in a data file representing the video clip 402.

In some implementations, the information about the video clip 402 may come in part from a data file associated with the video clip 402. For example, the video clip 402 could be stored in association with a data file representing a video project. A video project is a compilation of video clips, generally arranged by a user to form a coherent theme. For example, a video project could be a feature film, a television show, an interactive multimedia project, or other compilation of media. The video project may contain information about video clips, and the media authoring application 100 can identify this information in the video project and determine whether the information is relevant to a particular video clip 402 (e.g., a video clip stored in association with the video project). In some implementation, a user is sharing a video project, as opposed to just a video clip, and so the media authoring application 100 can identify information about the video project based on the video clips contained within the video project.

In some the information about the video clip 402 may come in part from a computer system (e.g., the computer system 104 shown in FIG. 1). For example, the author 408 of a video clip 402 could be identified based on a user of the computer system (e.g., a name of a user associated with a user account of the computer system could be identified as the author of a video clip).

The user interface also displays a control 412 that enables a user to publish the media content (e.g., the video clip 402) to a media destination, e.g., a "Share" button. When the user clicks (or otherwise invokes) the control 412, the media content is published to the media destination specified by the configuration represented by the user interface 400 and using the media characteristics specified by the configuration represented by the user interface 400.

The user interface 400 also displays media file characteristics 420 for the published video clip. The media file characteristics 420 describe characteristics of a data file generated when media content is published. For example, for a video clip, the media file characteristics 420 can include a predicted file size 422 for the published video clip, a running time 424 for the published video clip, a codec 426 used to generate the media file representing the published video clip, audio channel characteristics 428 of the published video clip (e.g., stereo or mono), and video definition 430 of the published video clip (e.g, 720p, 1080i, or other video definitions representing frame resolution, scan type, or other characteristics). The media file characteristics 420 allow a user to see, right in the user interface 400 of the media authoring application 100, characteristics of published media content expected by the media authoring application 100 (e.g., expected based on the chosen configuration for publishing the media content) before the media content is published.

The information about the video clip (or any other kind of media content) can also be saved for future publications of the video clip. For example, the second user interface 500 represents an information display 510 for the video clip referenced in the first user interface 400. The information display 510 enables a user to see information pertaining to a stored video clip, for example, information stored by the media authoring application 100 for retrieval when the video clip is accessed. The information display 510 includes share data 520 that can be used when the video clip represented by the information display 510 is published to a media destination. For example, the share data 520 can include a title 522 of the video clip, description 524 of the video in the video clip, a creator 526 of the video clip (e.g., who generated the file or filmed the video), and tags 528 indicating topics of the video clip. In some implementations, a user can input information to be used as some or all of the share data 520. In some implementations, some or all of the share data 520 can be determined based on information in the first user interface 400. For example, the title 404 for the video clip 402, description 406 of the video clip 402, author 408 of the video clip 402, and keywords 410 describing the video clip 402 can be entered by the user and carried over by the media authoring application 100 from the first user interface 400 into the share data 520 displayed in the second user interface 500. The share data 520 has fields corresponding to some or all of the fields displayed in the first user interface 400. For example, the title 404 of the video clip shown in the first user interface 400 can be carried over to the title 522 of the video clip shown in the second user interface 500. If information is stored as share data 520, when a user accesses the first user interface 400 for a clip, the share data 520 can be accessed and carried over to the first user interface 400 in the fields representing the corresponding type of information. For example, the tags 528 of the share data 520 can be carried over to the keywords 410 in the first user interface 500. A user may have the option of modifying any of the information shown in the first user interface 400 or the share data 520 shown in the second user interface, even if the information or share data was derived from another source (e.g., information about a video clip derived from the share data). The user interface 500 may also present a share count 530 indicating information about how many times the video clip has been published. Other information about when and to what media destinations the video content has been published could also be displayed.

Figure 7:
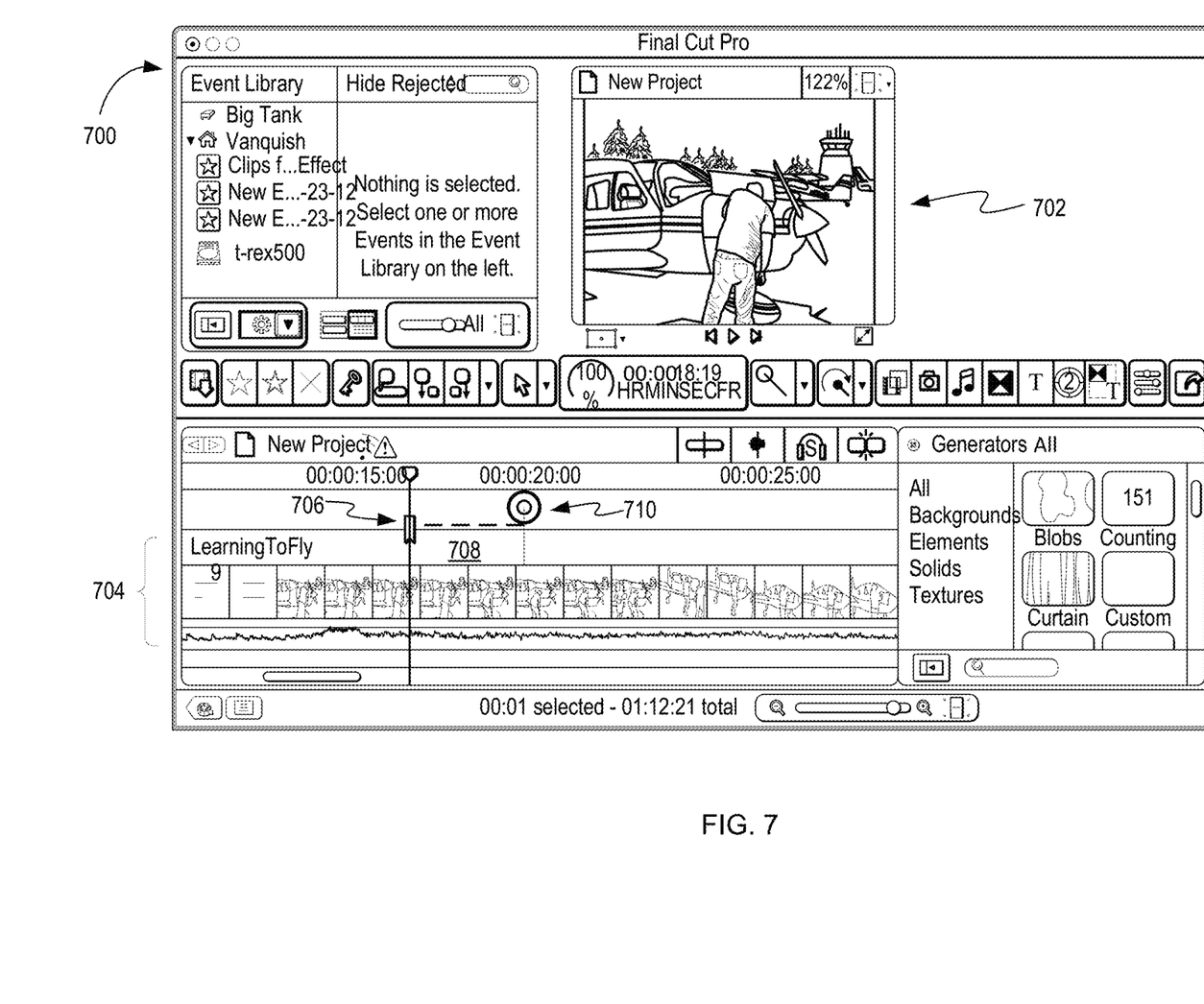
FIG. 7 shows a view of a user interface for indicating information used when media content is published.

FIG. 7 shows a view of a user interface 700 for indicating information used when media content is published. For example, the user interface 700 as shown includes a video clip 702 being prepared for publishing (e.g. being formatted for a media destination or formatted for inclusion in a media file). A video clip 702 can be divided into "chapters" which each represent a portion of the video content of the video clip. For example, the video clip 702 can be delineated with the boundaries of each chapter. In some examples, the video clip 702 is formatted into a data file containing data describing the beginning and/or end of each chapter. When the video clip 702 is published, the video clip 702 may be displayed in a user interface that enables a viewer to select a chapter of the video clip 702 to view. Each chapter is sometimes represented by a single video frame displayed as a still image representing the chapter. In some implementations, the first or last frame of video content of the chapter is used to represent the chapter in these kinds of user interfaces. In some implementations, a video frame can be chosen based on its content, e.g., a video frame chosen because it best represents the video content of the chapter. For example, the user interface 700 can display a series of frames 704 representing the video clip 702. The series of frames 704 represent frames chosen at substantially equal intervals within the video clip 702 to provide a static, linear view of the video content of the video clip 702. Chapters can be indicated in the series of frames 704. For example, a user of the user interface 700 can place a chapter marker 706 indicating the start of a new chapter 708 in the video clip 702. Further, the user can also place a separate chapter frame marker 710 indicating a single frame to be used when a still image is used to represent the chapter 708 in user interfaces displaying the published video clip 702. An indication of the frame indicated by the chapter frame marker 710 can be stored with data representing the video clip 702 when the video clip 702 is published. In this way, a still image representing the chapter can be chosen, for example, if the default frame (e.g., the first frame) is not suitable to represent the chapter (e.g., if the default frame is a black screen or otherwise contains video data not relevant to the chapter as a whole).

Figure 8:
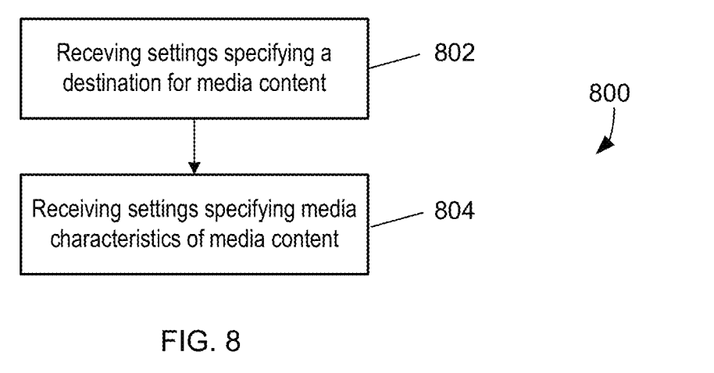
FIG. 8 is a flowchart of an exemplary process of preparing to share media content.

FIG. 8 is a flowchart of an exemplary process 800 of preparing to share media content. The process 800 can be performed, for example, by a media authoring application 100 running on a computer system 104 shown in FIG. 1. The process includes receiving 802, from a user of a user interface of a media authoring application, first settings specifying a destination for media content (e.g, a video clip) authored in the media authoring application. Media content is said to be authored in the media authoring application if the media content has been generated, imported into, or modified in the media authoring application. The destination can be selected from a set of destinations supported by the media authoring application. For example, the destination can be a social networking service and the first settings can include information about a user account of the social networking service. In some examples, the first settings can specify a second destination for the media content. The process also includes receiving 804 second settings specifying a set of media characteristics of media content authored in the media authoring application. For example, the second settings can specify a second set of media characteristics for the media content. The process also includes generating 806 data representing a user interface element usable to provide media content authored in the media authoring application to the destination specified in the first settings at the set of media characteristics specified in the second settings. For example, the user interface element can be dragged from the user interface of the media authoring application to share the data in the form of a data file. In some implementations of the process 800, a mechanism can be provided to share the data representing the user interface element with users other than the user of the user interface of the media authoring application.

Figure 9:
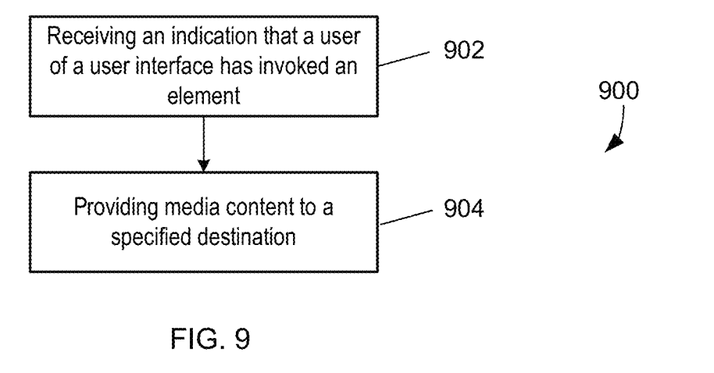
FIG. 9 is a flowchart of an exemplary process of sharing media content.

FIG. 9 is a flowchart of an exemplary process 900 of sharing media content. The process 800 can be performed, for example, by a media authoring application 100 running on a computer system 104 shown in FIG. 1. The process includes receiving 902 an indication that a user of a user interface of a media authoring application has invoked a first user interface element in a menu of user interface elements. Each user interface element represents data that includes first settings specifying a destination for media content authored in the media authoring application, the destination selected from a set of destinations supported by the media authoring application, and second settings specifying a set of media characteristics of media content authored in the media authoring application. The process 900 also includes providing 904, in response to the user having invoked the first user interface element, media content authored in the media authoring application to the destination specified in the first settings at the set of media characteristics specified in the second settings. In some implementations of the process 900, metadata of the media content can be accessed, and an interface can be provided enabling the user to select at least some of the metadata to include in the media content supplied to the destination. In some implementations of the process 900, the selected metadata can be stored for subsequent provisions of the media content to other destinations selected from among the set of destinations supported by the media authoring application. In some implementations of the process 900, for at least one user interface element in the menu of user interface elements, an indication can be provided in the user interface of media file characteristics for media content generated if the user were to invoke the at least one user interface element.

Figure 10:
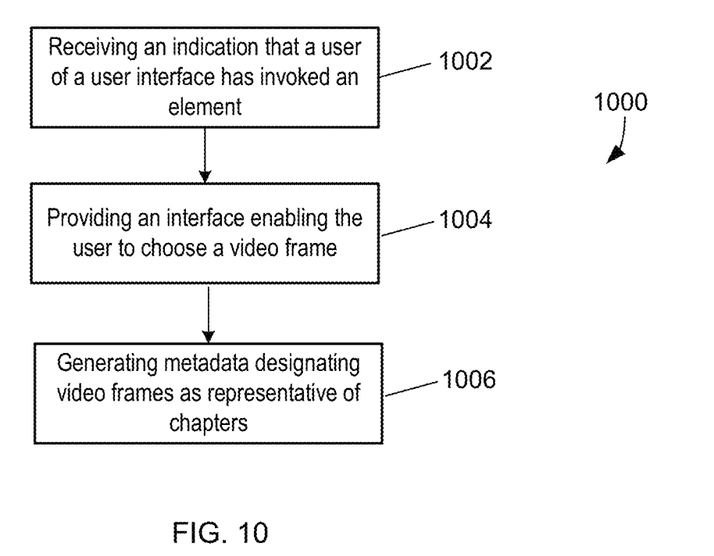
FIG. 10 is a flowchart of an exemplary process of sharing video content.

FIG. 10 is a flowchart of an exemplary process 1000 of sharing video content. The process 1000 can be performed, for example, by a media authoring application 100 running on a computer system 104 shown in FIG. 1. The process 1000 includes receiving 1002 an indication that a user of a user interface of a video authoring application has invoked a user interface element. The user interface element represents data that includes first settings specifying a destination for video content authored in the video authoring application and second settings specifying a set of video characteristics of video content authored in the video authoring application. The process 1000 also includes providing 1004 an interface enabling the user to choose a video frame from among video frames of each chapter, in response to the user having invoked the first user interface element, for first video content chosen by the user, the first video content having chapters each representing a portion of the first video content. The process 1000 also includes generating 1006 metadata designating each chosen video frame as representative of the content of each chapter. In some implementations of the process 1000, the video content and the generated metadata is provided to the destination specified in the first settings.

Figure 11:
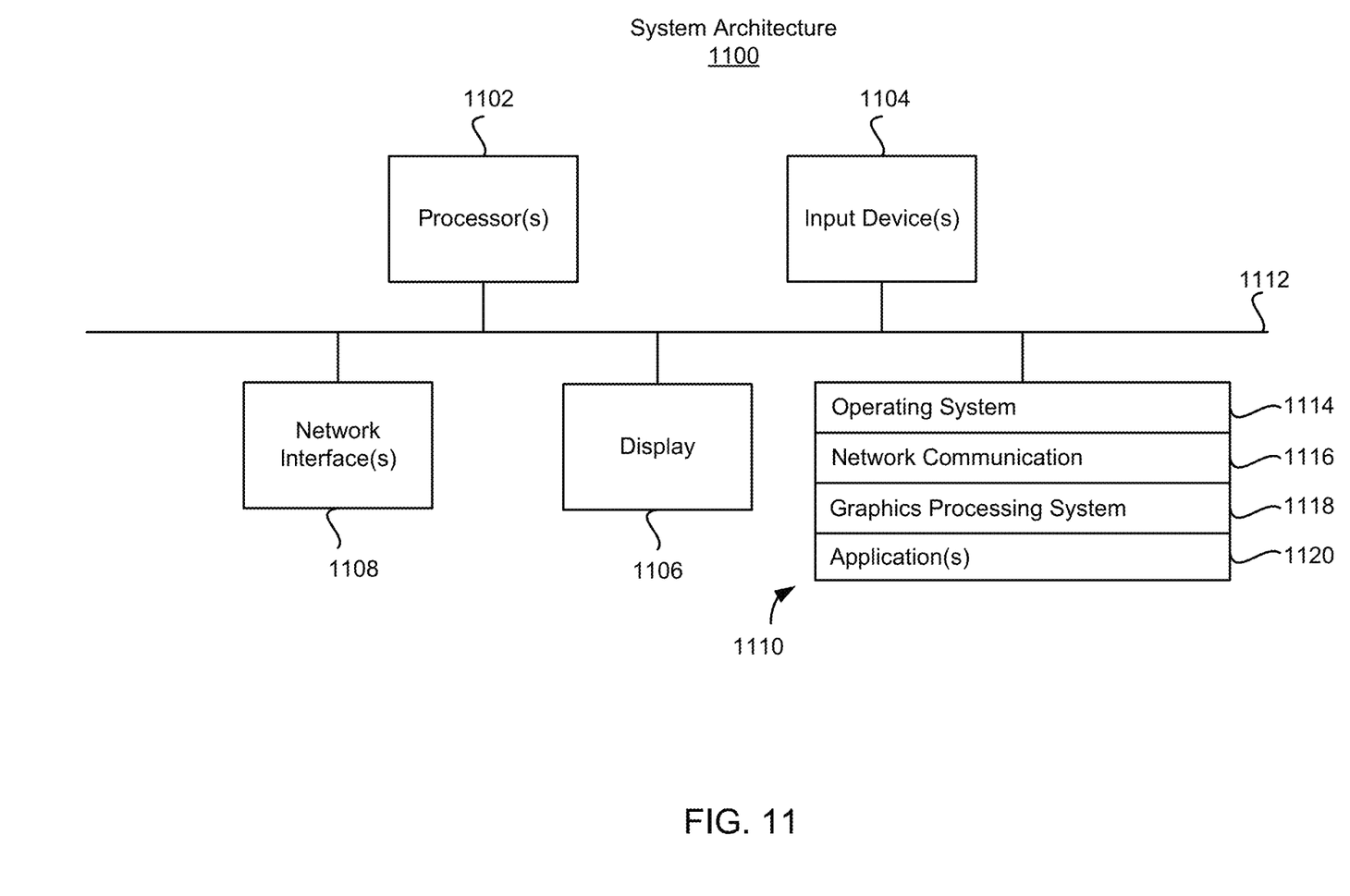
FIG. 11 is a block diagram of an exemplary system architecture implementing the features and processes of FIGS. 1-10.

FIG. 11 is a block diagram of an exemplary system architecture implementing the features and processes of FIGS. 1-10. The architecture 1100 can be implemented on any electronic device that runs software applications derived from compiled instructions, including without limitation personal computers, servers, smart phones, media players, electronic tablets, game consoles, email devices, etc. In some implementations, the architecture 1100 can include one or more processors 1102, one or more input devices 1104, one or more display devices 1106, one or more network interfaces 1108 and one or more computer-readable mediums 1110. Each of these components can be coupled by bus 1112.

Display device 1106 can be any known display technology, including but not limited to display devices using Liquid Crystal Display (LCD) or Light Emitting Diode (LED) technology. Processor(s) 1102 can use any known processor technology, including but are not limited to graphics processors and multi-core processors.

Input device 1104 can be any known input device technology, including but not limited to a keyboard (including a virtual keyboard), mouse, track ball, and touch-sensitive pad or display. In some implementations, the input device 1104 could include a microphone that facilitates voice-enabled functions, such as speech-to-text, speaker recognition, voice replication, digital recording, and telephony functions. The input device 1104 can be configured to facilitate processing voice commands, voiceprinting and voice authentication. In some implementations, audio recorded by the input device 1104 is transmitted to an external resource for processing. For example, voice commands recorded by the input device 1104 may be transmitted to a network resource such as a network server which performs voice recognition on the voice commands.

Bus 1112 can be any known internal or external bus technology, including but not limited to ISA, EISA, PCI, PCI Express, NuBus, USB, Serial ATA or FireWire. Computer-readable medium 1110 can be any medium that participates in providing instructions to processor(s) 1102 for execution, including without limitation, non-volatile storage media (e.g., optical disks, magnetic disks, flash drives, etc.) or volatile media (e.g., SDRAM, ROM, etc.).

Computer-readable medium 1110 can include various instructions for implementing an operating system 1114 (e.g., Mac OS®, Windows®, Linux). The operating system can be multi-user, multiprocessing, multitasking, multithreading, real-time and the like. The operating system performs basic tasks, including but not limited to: recognizing input from input device 1104; sending output to display device 1106; keeping track of files and directories on computer-readable medium 1110; controlling peripheral devices (e.g., disk drives, printers, etc.) which can be controlled directly or through an I/O controller; and managing traffic on bus 1112. Network communications instructions 1116 can establish and maintain network connections (e.g., software for implementing communication protocols, such as TCP/IP, HTTP, Ethernet, etc.).

A graphics processing system 1118 can include instructions that provide graphics and image processing capabilities. For example, the graphics processing system 1118 can display the user interfaces 200, 300, 500, 66 described with reference to FIGS. 2-7.

Application(s) 1120 can be the media authoring application 100 that implements the processes and displays the user interfaces described in reference to FIGS. 1-10. The processes can also be implemented in operating system 1114.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., Objective-C, Java), including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors or cores, of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network. The relationship of client and server arises by virtue of computer programs running on the respective computers and having a client-server relationship to each other.

One or more features or steps of the disclosed embodiments can be implemented using an API. An API can define on or more parameters that are passed between a calling application and other software code (e.g., an operating system, library routine, function) that provides a service, that provides data, or that performs an operation or a computation.

The API can be implemented as one or more calls in program code that send or receive one or more parameters through a parameter list or other structure based on a call convention defined in an API specification document. A parameter can be a constant, a key, a data structure, an object, an object class, a variable, a data type, a pointer, an array, a list, or another call. API calls and parameters can be implemented in any programming language. The programming language can define the vocabulary and calling convention that a programmer will employ to access functions supporting the API.

In some implementations, an API call can report to an application the capabilities of a device running the application, such as input capability, output capability, processing capability, power capability, communications capability, etc.

A number of implementations have been described. Nevertheless, it will be understood that various modifications may be made. For example, other steps may be provided, or steps may be eliminated, from the described flows, and other components may be added to, or removed from, the described systems. Accordingly, other implementations are within the scope of the following claims.

What is claimed is:

1. A method comprising:
    displaying, in a user interface of a media authoring application, a menu of user interface elements, at least some of the user interface elements each representing data that includes respective settings specifying a respective destination for media content authored in the media authoring application, the respective destination selected from a set of destinations supported by the media authoring application, and respective settings specifying a respective set of media characteristics of media content authored in the media authoring application;
    receiving an indication that a user of the user interface has invoked a first user interface element among the user interface elements of the menu, the first user interface element representing data that includes first settings specifying a first destination selected from the set of destinations supported by the media authoring application, second settings specifying a first set of media characteristics that are associated with the first destination, third settings specifying a second destination selected from the set of destinations supported by the media authoring application, and fourth settings specifying a second set of media characteristics that are associated with the second destination; and
    in response to the user having invoked the first user interface element, providing media content authored in the media authoring application to the first destination specified in the first settings at the first set of media characteristics specified in the second settings and providing media content authored in the media authoring application to the second destination specified in the third settings at the second set of media characteristics specified in the fourth settings.

2. The method of claim 1 comprising accessing metadata of the media content and providing an interface enabling the user to select at least some of the metadata to include in the media content supplied to the first destination and the second destination.

3. The method of claim 2 comprising storing the selected metadata for subsequent provisions of the media content to other destinations selected from among the set of destinations supported by the media authoring application.

4. The method of claim 1 comprising, for at least one user interface element in the menu of user interface elements, providing an indication in the user interface of media file characteristics for media content generated if the user were to invoke the at least one user interface element.

5. The method of claim 1, wherein providing media content authored in the media authoring application to the first destination specified in the first settings at the first set of media characteristics specified in the second settings and providing media content authored in the media authoring application to the second destination specified in the third settings at the second set of media characteristics specified in the fourth settings comprises:
  1) generating second media content comprising at least one frame of video, the at least one frame of video formatted based on the first set of media characteristics specified in the second settings and based on the second set of media characteristics specified in the fourth settings, and
  2) providing the formatted second media content to the first destination specified in the first settings and to the second destination specified in the third settings.

6. The method of claim 1 comprising, in response to the user having invoked the first user interface element, formatting the media content based on the first set of media characteristics specified in the second settings to generate formatted media content and formatting the media content based on the second set of media characteristics specified in the fourth settings to generate formatted media content, and
  wherein providing the media content authored in the media authoring application at the first set of media characteristics specified in the second settings comprises providing the formatted media content to the first destination specified in the first settings and providing the media content authored in the media authoring application at the second set of media characteristics specified in the fourth settings comprises providing the formatted media content to the second destination specified in the third settings.

7. A method comprising:
  receiving an indication that a user of a user interface of a video authoring application has invoked a user interface element representing data that includes first settings specifying a first destination for video content authored in the video authoring application, second settings specifying a first set of video characteristics that are associated with the first destination, third settings specifying a second destination for video content authored in the video authoring application, and fourth settings specifying a second set of video characteristics that are associated with the second destination; and
  in response to the user having invoked the user interface element, for first video content chosen by the user, the first video content having chapters each representing a portion of the first video content, providing an interface enabling the user to choose a video frame from among video frames of each chapter; and
  generating metadata designating each chosen video frame as representative of content of each chapter.

8. The method of claim 7, comprising providing the video content and the generated metadata to the first destination specified in the first settings and to the second destination specified in the third settings.

9. A non-transitory computer readable storage device encoded with instructions that, when executed by a computer system, cause the computer system to carry out operations comprising:
  displaying, in a user interface of a media authoring application, a menu of user interface elements, at least some of the user interface elements each representing data that includes respective settings specifying a respective destination for media content authored in the media authoring application, the respective destination selected from a set of destinations supported by the media authoring application, and respective settings specifying a respective set of media characteristics of media content authored in the media authoring application;
  receiving an indication that a user of the user interface has invoked a first user interface element among the user interface elements of the menu, the first user interface element representing data that includes first settings specifying a first destination selected from the set of destinations supported by the media authoring application, second settings specifying a first set of media characteristics that are associated with the first destination, third settings specifying a second destination selected from the set of destinations supported by the media authoring application, and fourth settings specifying a second set of media characteristics that are associated with the second destination; and
  in response to the user having invoked the first user interface element, providing media content authored in the media authoring application to the first destination specified in the first settings at the first set of media characteristics specified in the second settings and providing media content authored in the media authoring application to the second destination specified in the third settings at the second set of media characteristics specified in the fourth settings.

10. The non-transitory computer readable storage device of claim 9, the operations comprising accessing metadata of the media content and providing an interface enabling the user to select at least some of the metadata to include in the media content supplied to the first destination and the second destination.

11. The non-transitory computer readable storage device of claim 10, the operations comprising storing the selected metadata for subsequent provisions of the media content to other destinations selected from among the set of destinations supported by the media authoring application.

12. The non-transitory computer readable storage device of claim 10, the operations comprising, for at least one user interface element in the menu of user interface elements, providing an indication in the user interface of media file characteristics for media content generated if the user were to invoke the at least one user interface element.

13. The non-transitory computer readable storage device of claim 9, wherein providing media content authored in the media authoring application to the first destination specified in the first settings at the first set of media characteristics specified in the second settings and providing media content authored in the media authoring application to the second destination specified in the third settings at the second set of media characteristics specified in the fourth settings comprises:
1) generating second media content comprising at least one frame of video, the at least one frame of video formatted based on the first set of media characteristics specified in the second settings and based on the second set of media characteristics specified in the fourth settings, and
2) providing the formatted second media content to the first destination specified in the first settings and to the second destination specified in the third settings.

14. The non-transitory computer readable storage device of claim 9, the operations comprising, in response to the user having invoked the first user interface element, formatting the media content based on the first set of media characteristics specified in the second settings to generate formatted media content and formatting the media content based on the second set of media characteristics specified in the fourth settings to generate formatted media content, and
wherein providing the media content authored in the media authoring application at the first set of media characteristics specified in the second settings comprises providing the formatted media content to the first destination specified in the first settings and providing the media content authored in the media authoring application at the second set of media characteristics specified in the fourth settings comprises providing the formatted media content to the second destination specified in the third settings.

15. A non-transitory computer readable storage device encoded with instructions that, when executed by a computer system, cause the computer system to carry out operations comprising:
receiving an indication that a user of a user interface of a video authoring application has invoked a user interface element representing data that includes first settings specifying a first destination for video content authored in the video authoring application, second settings specifying a first set of video characteristics that are associated with the first destination, third settings specifying a second destination for video content authored in the video authoring application, and fourth settings specifying a second set of video characteristics that are associated with the second destination; and
in response to the user having invoked the user interface element, for first video content chosen by the user, the first video content having chapters each representing a portion of the first video content, providing an interface enabling the user to choose a video frame from among video frames of each chapter; and
generating metadata designating each chosen video frame as representative of content of each chapter.

16. The non-transitory computer readable storage device of claim 15, the operations comprising providing the video content and the generated metadata to the first destination specified in the first settings and to the second destination specified in the third settings.

\* \* \* \* \*